Patented Jan. 5, 1943

UNITED STATES PATENT OFFICE 2,307,491

STARCH CONVERSION PROCESS

Raymond E. Daly, Chicago, Ill., and James F. Walsh, Tuckahoe, N. Y., assignors to American Maize-Products Company, a corporation of Maine No Drawing. Application May 3, 1940, Serial No. 333,108

4 Claims. (Cl. 127—39)

Our invention relates to corn starch conversion processes and products and more particularly to an improved process in which high yields of starch conversion products are obtained and in which the conversion of the starch may be effected in the presence of the protein and fiber constituents of the corn.

In our copending parent application Serial No. 208,544, filed May 18, 1938, we have disclosed and claimed generally the process of this invention in which the conversion action is carried out in the presence of substantially all of the components of the corn except the germ and solubles and which process may be effected in a single stage or continuous manner. The present application is a continuation in part of the above parent application and is directed particularly to a discontinuous conversion process carried out in more than one stage; the conversion action being carried out on the starchy components of the corn after the soluble proteins have been substantially removed but not necessarily the insoluble proteins and fiber. This multiple stage conversion process is applicable to starch materials containing substantial amounts of insoluble proteins or fiber or mixtures thereof.

In the commercial manufacture of corn syrup and similar starch conversion products heretofore, it has been the usual custom first to separate the starch as completely as possible from all of the other constituents of the corn before subjecting the starch to the conversion treatment, that is, to convert it into corn syrup and the like. A marked improvement upon this usual prior art procedure is disclosed in our Patent No. 2,094,558 issued September 28, 1937, and the present invention constitutes principally an improvement upon the process disclosed in that patent from the standpoint of conversion of the starch in the presence of fiber or protein and in two stages which facilitates conversion and gives improved products.

In accordance with our above patented process the commonly used tabling operation for separating the starch from the gluten is eliminated with consequent saving in time and labor and with production of a higher yield of starch. The process was based upon the discovery that the water soluble proteins interfere with the starch conversion action but the water insoluble proteins do not so interfere and accordingly conversion of the starch may be satisfactorily effected in the presence of the insoluble proteins provided the soluble proteins and other soluble substances normally contained in the starch have been removed prior to conversion preferably by repeated washing of the ground degerminated corn with water.

In accordance with our present invention we have discovered further that substantial savings in the cost of production of converted products, and high yields thereof over the conventional prior art processes, can be obtained and also that appreciable advantages over our above patented process may be had, by subjecting substantially all of the corn constituents except the germ and solubles to the conversion action and effecting the conversion in at least two stages. We have found that the starch conversion process may be carried out in the presence of the cellulose or fiber component of the starch as well as in the presence of all of the other constituents of the corn except the germ and soluble substances; and that the efficiency of the conversion may be substantially increased by reversion may of certain of the conversion inhibiting materials after the first mild stage of the conversion in which the starch is solubilized.

By this improved process the yield of starch over the usual prior art processes is about 2½ to 3 pounds more per bushel of corn, and about ½ to 1 pound more starch per bushel of corn than that obtained in our patented process. Furthermore, this improved process eliminates the necessity of reels normally used in all of the processes suggested heretofore, for effecting separation of the fiber from the starch and protein components. Elimination of these reels effects substantial saving in time and labor and saving of an appreciable amount of starch that normally remains with the fiber, which is separated from the starch and protein components by these reels.

As above suggested, an appreciable amount of the starchy components of the corn are usually lost when the cellulose or fiber content of the corn is separated from the starch and protein prior to conversion. This is in addition to the substantial amount of starch that adheres to the protein and is lost during the conventional tabling operation to separate the starch from the protein or gluten. None of the attempts made heretofore to save the starch adhering to the fiber has been commercially satisfactory. One of the principal reasons for the failure, we have found, is that the starch conversion action is inhibited by the presence of the soluble substances in the corn, thereby requiring more drastic conversion conditions, which in the presence of the fiber results in decomposition products that are difficult to separate from the resulting mass. In our process the soluble substances are removed prior to conversion so that the conversion operation may be carried out more easily and to avoid formation of the undesirable decomposition products. Furthermore, the discontinuous conversion process enables removal of the fiber at an intermediate stage of conversion after the associated starch has been solubilized and saved for further conversion.

A feature of our process comprises making certain pH adjustments in the starch conversion liquor to effect removal of coagulated substances, which when allowed to remain in the liquor as is usually the case, will produce a haze or cloudiness on standing. By proper adjustment of the pH to substantially the isoelectric point of the proteins of the liquor the colloidal proteins will coagulate and enable their removal from the liquor without the use of a coagulating agent.

The conversion treatment for converting the starch in the presence of the insoluble protein and fiber, which has been previously freed of solubles, may be effected in either one stage or in a number of stages. Specific examples of the conditions for single and multiple stage conversion are given hereinafter. In a multiple stage conversion, the first stage may consist of a mild conversion action just sufficient to render the starch soluble and capable of being readily filtered, and thereby enable its separation from the insoluble protein and fiber. This mild conversion may be effected by the use of enzymes or acid or combinations thereof as the starch converting agent and is carried out under mild conversion conditions to avoid decomposition of the associated impurities particularly proteins and fiber. The partially converted starch liquor, after separation from the non-starchy solid components is then subjected to further conversion treatment using either enzymes or acid or both as the conversion accelerating agent to produce the desired final degree of conversion. When both the first and the second conversions are made with acid as the conversion agent, the process includes the following: washing the degerminated corn with water to remove the soluble proteins, treating the remaining starch, insoluble protein, and fiber mixture with a starch conversion agent to solubilize the starch in the absence of soluble substances whereby decomposition of the fiber is prevented, neutralizing the mixture and filtering to separate the insoluble protein and fiber from the solubilized starch, subjecting the solubilized starch to a further conversion treatment to effect the desired degree of conversion, adjusting the pH of the starch conversion liquor to about 4 to 5 to effect coagulation of insoluble substances, filtering to remove said coagulated substances, concentrating, readjusting the pH of the starch conversion liquor to about 6.5 to 7.5, filtering, readjusting the pH to 4.5 to 6.0 and concentrating said liquor to produce a corn syrup of the desired degree of concentration, details that are not given being conventional. A preferred procedure is to use acid for the first stage of conversion and to complete the conversion in the second stage with enzymes to give the desired reducing sugars (dextrose and maltose) content. The acid conversion usually would not be carried out beyond a reducing sugars content of about 60% and preferably only to a lower content such as 25% to 45%, as its primary purpose is to allow of separating the insoluble proteins and fiber from the solubilized carbohydrates. The subsequent enzyme conversion may be carried out sufficiently to raise the reducing sugars content to a desired higher amount such as 72% reducing sugars.

The process of our invention will be more clearly understood from the following detailed description which describes the several stages in the process from the first treatment of the corn to the final production of the corn syrup.

Corn from a corn tower or other supply, is steeped in the usual steeping tanks with a solution of sulphur dioxide and water to remove solubles and soften the skin or fiber envelope so as to permit subsequent separation of its components, after which the corn is passed through attrition mills wherein it is subjected to a grinding treatment sufficient to liberate the germ. The mixture of germs and other corn constituents is then passed through the germ separator which separates the germ from the starch, protein and fiber.

The starch, protein, and fiber produced as above constitute the basic materials that may be used in our process. The mixture of these constituents is passed through buhr mills which grind the starch, protein and fiber to rather fine particle size sufficient to permit thorough washing of these substances. The resulting ground mixture is washed with water and filtered several times, preferably using fresh water for each washing and filtration. This washing treatment removes from the ground mixture of starch, protein and fiber substantially all of the soluble proteins and other soluble substances present in the corn, which if allowed to remain, would inhibit the subsequent desired starch conversion action. The mixture of washed starch, insoluble protein, and fiber is next suspended in water to provide a suspension of suitable Baumé for conversion. The conversion, according to a specific but non-limiting two-stage process may be carried out as follows:

The starch, protein and fiber mixtures following the washing operation, and being substantially free of solubles, is made up to 14° Baumé. To a charge of 2050 gallons of this suspension is added 35 to 40 pounds of concentrated hydrochloric acid and the suspension is brought up to a pressure of 45 pounds. After holding the conversion at this pressure for from 7 to 11 minutes the mixture is discharged from the converting chamber and is neutralized to a pH of 4.5 to 5.0, with 13½ to 15½ pounds of soda ash. The mixture is then filtered to separate the insoluble proteins and fiber from the solubilized starch and any small amount of remaining proteins may be removed by treatment with carbon which also bleaches the filtrate. The pH of the liquor is adjusted to an optimum for the particular enzyme used, e. g. about 5.2. The filtrate is then further converted by treatment with about 1 to 5% of diastatic enzymes (for example, Diastase "S" of Rohm & Haas) at a temperature of about 130 to 135° F. until the desired degree of conversion is obtained, for example, to a 65% reducing sugars value, calculated as anhydrous dextrose. This is accomplished by continuing the conversion for about 4 to 6 hours. The converted liquor is then heated to about 175 to 200° F. to insure complete inactivation of the enzyme. The liquor is then filtered and bleached in accordance with the regular practice in the art and concentrated if desired.

One of the important features of the above described process is that the undesirable taste in the converted syrup, which normally results from straight acid conversion, is eliminated. This taste is a rather bitter, metallic taste that is usually produced during the latter stages of the conversion and has been attributed to the action of the acid accelerator. The acid conversion accelerator can be used for the lower stages of conversion, that is, to low reducing sugars content in the syrup such as for example about 25% to 35% reducing sugars calculated as dextrose on a dry weight basis, without the production of this metallic or bitter taste. From this stage on the conversion can be carried forward with enzymes as conversion accelerators, to the desired reducing sugars content, such as for example, 50% to 75% dextrose equivalent, without formation of the undesired taste.

For these reasons the procedure of first treating with acid and then with enzymes is advantageous but is not absolutely essential. The order of treatment with these two agents may be reversed in certain cases but is not as desirable because the enzymes would require a relatively long time to effect the first stage of conversion starting with the completely unconverted starch. Once the starch has been partially converted with acid however, as above explained, the conversion may be finished with the enzymes which will act readily on the partially converted starch. Also, where it is desired to carry the first stage of conversion only to the point of solubilizing the starch sufficiently to effect separation from the non-starchy components and not for the purpose of producing a sizable reducing sugars content, the first stage conversion may be carried out satisfactorily with enzymes, and the second stage with acid as described in the following example.

The starch protein and fiber mixture following the washing operation, and being substantially free of solubles, is made up to 10 to 20% solution. The starch content of this mixture is pasted in the presence of a small amount of acid at approximately 180 to 200° F. The mixture is cooled, pH adjusted, and 1 to 5% of a malt diastase is added to the suspension. The temperature and pH used are in accordance with the optimum activity of the malt diastase used. The diastatic conversion is carried to the point where the converted liquor will separate or filter easily from the non-starch solids. The partly converted or filtered liquor is then reacidified and converted to about 45% to 92% reducing sugars calculated as anhydrous dextrose. The liquor is finally neutralized, filtered, and bleached in accordance with the usual custom. The purpose of the enzyme pre-treatment is to remove the starch from the non-starch portion with a minimized reaction or breaking down of the non-starchy solids.

Another illustrative but non-limiting example of our process is as follows:

A syrup which has been produced by acid conversion of corn starch up to a reducing sugars content of about 42% (dextrose equivalent), filtered and the pH adjusted to about 5. to 6., is treated with about 5 to 1% of Diastase "S" (prepared commercially by Rohm & Haas) and the syrup and diastase heated to about 135° F. for about five hours. As a result of this further enzymatic conversion the reducing sugars content of the syrup is increased to about 70.1% (dextrose equivalent). Where desired activators, such as for example sodium perborate and calcium peroxide, may be used to speed up the activity of the enzymes.

Various modifications and changes may be made in the process described hereinabove, without departing from the scope of our invention, some of the novel features of which are defined in the appended claims.

We claim:

1. A process of producing a corn syrup from degerminated corn, comprising washing the degerminated corn with water to remove the soluble proteins, treating the remaining starch, insoluble protein, and fiber mixture with a starch conversion agent to solubilize the starch in the absence of soluble proteins with a minimum degrading action on the non-starchy components, neutralizing the mixture and filtering to separate the insoluble protein and fiber from the solubilized starch, subjecting the solubilized starch to a further conversion treatment to effect the desired degree of conversion, and refining and concentrating said liquor to produce a corn syrup of the desired degree of concentration.

2. A process of producing from degerminated corn, a substantially higher yield of corn starch conversion syrup than is obtainable with the usual processes in which the starch is first isolated from the insoluble proteins and fiber, comprising milling and thoroughly washing the degerminated corn to remove substantially all soluble conversion inhibiting proteins, converting the remaining starch insoluble proteins and fiber under relatively mild conversion conditions to solubilize the starch and permit separation thereof from the non-starchy components with a minimum degradating action on the non-starchy components, removing the solubilized starch from the insoluble protein and fiber and completing the conversion of the solubilized starch to form the aforesaid starch conversion syrup.

3. A process of producing a corn syrup from degerminated ground corn which contains corn starch and other non-starchy components that are decomposable and that have appreciable amounts of starch intimately associated therewith, said process being characterized by conversion of substantially all of the starch present and without substantial decomposition of the non-starchy components, comprising washing the ground corn mixture to remove the conversion inhibiting soluble constituents particularly the soluble proteins, treating the washed starch mixture containing starch and non-starchy components with a starch conversion accelerating acid sufficiently to at least solubilize the starch so that it may be separated from the non-starchy components, neutralizing the mixture and filtering to separate out the non-starchy components from the solubilized starch, subjecting the solubilized starch to a further conversion treatment with enzymes until the desired degree of conversion is effected and said corn syrup is produced.

4. A process of producing a corn syrup from degerminated ground corn which contains corn starch and other non-starchy components that are decomposable and that have appreciable amounts of starch intimately associated therewith, said process being characterized by conversion of substantially all of the starch present and without substantial decomposition of the non-starchy components, comprising washing the ground corn mixture to remove the conversion inhibiting soluble constituents particularly the soluble proteins, treating the washed starch mixture containing starch and non-starchy components with enzymes sufficiently to at least solubilize the starch so that it may be separated from the non-starchy components, and filtering to separate out the non-starchy components from the solubilized starch, subjecting the solubilized starch to a further conversion treatment with a starch conversion accelerating acid until the desired degree of conversion is effected and said corn syrup is produced.

RAYMOND E. DALY.
JAMES F. WALSH.